Feb. 24, 1970

C. BERGER ET AL 3,497,389

ION EXCHANGE MEMBRANE AND FUEL CELL CONTAINING SAME

Filed Oct. 20, 1964

CARL BERGER
ANDREW D. KELMERS
INVENTORS

BY *Max Geden*

ATTORNEY

United States Patent Office 3,497,389
Patented Feb. 24, 1970

3,497,389
ION EXCHANGE MEMBRANE AND FUEL
CELL CONTAINING SAME
Carl Berger, Santa Ana, Calif., and Andrew D. Kelmers, Oak Ridge, Tenn., assignors, by mesne assignments, to McDonnell Douglas Corporation, Santa Monica, Calif., a corporation of Maryland
Filed Oct. 20, 1964, Ser. No. 405,079
Int. Cl. H01m 27/00; B01k 3/10; B01d 39/14
U.S. Cl. 136—86                                    15 Claims

ABSTRACT OF THE DISCLOSURE

An ion exchange membrane comprising an inorganic ion conducting material, e.g., an inorganic ion exchange material selected from the group consisting of insoluble hydrous metal oxides, insoluble metal hydroxides, and water insoluble acid salts, and about 1% to about 80% by weight of the composition of a water balancing or water retaining agent which retains a sufficient amount of water and provides a suitable water vapor pressure, at a given temperature to substantially increase the ionic conductivity of said material at said temperature, e.g., silicic acid, an aluminosilicate, colloidal silica, and the like, said ion exchange membrane being particularly useful in fuel cells and maintaining high conductivity during operation of the fuel cell particularly at elevated temperatures of the order of about 100° C. and above.

---

Figure 1:
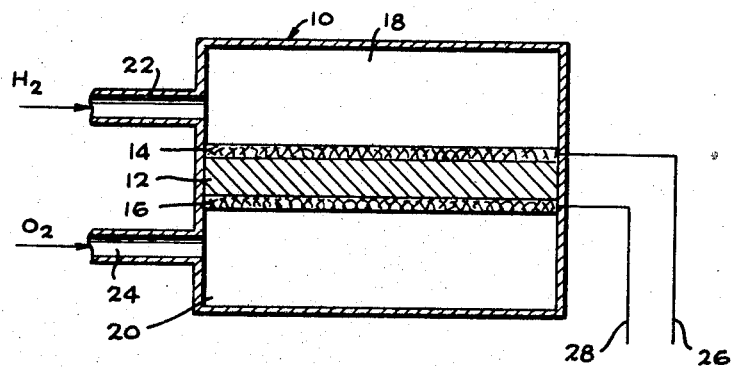

This invention relates to ion exchange membranes which are particularly useful in fuel cells, and is especially concerned with novel ion exchange membranes embodying means therein to retain water and maintain water balance in the membrane when the latter is employed in a fuel cell, particularly at temperatures above about 100° C., so as to provide a highly conductive and efficient membrane for use in fuel cells at such elevated temperatures.

The invention described herein was made in the performance of work under a NASA contract and is subject to the provisions of Section 305 of the National Aeronautics and Space Act of 1958, Public Law 85–568 (72 Stat. 435; 42 U.S.C. 2457).

One of the main problems involved in the use of ion exchange membranes, and particularly inorganic ion exchange membranes in fuel cells is the necessity for retaining a sufficient amount of water in the membrane to obtain high conductivity and high operating efficiency of the fuel cell. This difficulty becomes even more acute where the fuel cell is intended to be operated at temperatures above about 100° C. as is required in certain types of operations. In addition there is also presented the problem of maintaining the physical integrity and cohesiveness of the ion exchange membrane during operation in a fuel cell.

Typical of an inorganic ion exchange membrane for fuel cells is the inorganic ion conducting material zirconium phosphate. Thus, for example, in a hydrogen-oxygen fuel cell employing such a membrane, the zirconium phosphate is disposed between catalyst electrodes and the mechanism of operation is that the hydrogen ion which is formed at the anode is transported through and thus migrates to the cathode, uniting with hydroxyl ion at the cathode to form water. It has been found that sufficient quantities of bound and interstitial water are required for high conductivity, especially above 100° C. Also, in a fuel cell employing hydrocarbon fuels, it is necessary to retain sufficient water vapor pressure in the pores of the membrane to insure good conductivity and a sufficient quantity of water at the catalyst-electrolyte (ion exchange membrane) interface and within the catalyst pores, particularly at the high operating temperatures of about 150° to about 200° C. at which cells of this type generally operate.

It is accordingly an object of the present invention to provide ion exchange membranes embodying water retaining or water balancing means to maintain high conductivity of the ion exchange membrane, especially when employed in a fuel cell.

Another object of the invention is the provision of efficient inorganic ion exchange membranes, for example, zirconium phosphate membranes, which contain an agent to retain and to balance the water in the membranes so as to provide a membrane having high ionic conductivity and having good physical integrity and cohesiveness when employed in fuel cells using gaseous or liquid fuels such as hydrogen, oxygen, ammonia, hydrocarbons, and the like, at temperatures above 100° C., and the provision of improved fuel cells capable of operating at temperatures above 100° C., and incorporating such improved ion exchange membranes of high conductivity.

Other objects and advantages of the invention will appear hereinafter.

It has now been found that the above objects and advantages can be achieved and an ion exchange membrane of high conductivity and strength provided, and especially suited for application in fuel cells, particularly those operating at temperatures at or above 100° C., by incorporating in the ion exchange matrix inorganic additives of controlled water vapor characteristics capable of retaining water and providing suitable and preferably substantial water vapor pressures above 100° C., for this purpose. Typical and preferred water balancing agents for purposes of the invention include silicic acid, aluminosilicates, phosphorus pentoxide, aluminum sulfate and copper sulfate.

However, any water balancing agent can be incorporated in the ion exchange membrane which will balance the amount of water in the membrane at a given temperature, and particularly at tempeartures above 100° C., to provide maximum conductivity of such membrane at such temperature. Suitable water balancing agents are those which when present in an organic membrane incorporated in a fuel cell, such as an oxygen-hydrogen fuel cell, provide a substantial water vapor pressure at temperatures above 100° C., e.g., as result of water retained by electrochemical reaction in the cell or as result of water drawn in from the surrounding atmosphere. Thus, water balancing agents can be employed which when present in an inorganic membrane incorporated in a fuel cell provide a water vapor pressure of from about 10 to about 200 mm. at 100° C. and atmospheric pressure. Where hydrocarbon fuels, e.g., methane, propane, butane, hexane, gasoline, and the like, are employed, involving oxidation thereof in the fuel cell at higher temperature, suitable water balancing agents include those which provide a water vapor pressure of the order of about 400 to about 750 mm. pressure at between 150° and about 200° C. at atmospheric pressure. Examples of water balancing agents in addition to those noted above, and which also can be employed herein, include Ludox (colloidal silica), Cab-O-Sil (diatomaceous earth colloidal silica), ammonium acid phosphate, activated alumina, silica gel and calcium chloride.

The water balancing agent can be incorporated into the ion exchange material during the process of fabricating the ion exchange membrane. The amount of water balancing or water retaining agent employed can range from as little as about 1% up to about 80% by weight of the mixture including the ion exchange material. In preferred practice, however, the amount of such water balancing agent employed ranges from about 5 to about 50% by weight of such mixture.

As will be pointed out in greater detail below, tests have shown that the incorporation of the water balancing agent into the ion exchange matrix according to the invention dramatically reduces the resistance of the ion exchange membrane as compared to the resistance of the same membrane in the absence of such water balancing agent. Thus, for example, the resistance of a purse zirconium phosphate ion exchange membrane can be of the order of several thousand ohm-cm. or greater, whereas the same zirconium phosphate membrane containing a water balancing agent as described above, can have a resistance substantialliy less than 100 ohm-cm.

Ion exchange membranes to which the water balancing agent principles of the invention can be applied include any membrane either organic or inorganic which will provide an ion conductive system and wherein the water balancing agent which is incorporated into such ion exchange membrane has the ability to withdraw and retain water which is either generated at the electrodes of the fuel cell, or is drawn in from the surrounding water vapor of the environment. Typical of the preferred inorganic ion exchange membranes which are employed, are the water insoluble acid salts such as zirconium phosphate and the water insoluble hydrous metal oxides such as hydrous zirconium oxide. Examples of other hydrous oxide ion exchange or ion conducting materials which can be employed to form the ion exchange membranes include the insoluble hydrous oxides of titanium, antimony, tungsten, silicon, scandium, bismuth, vanadium, chromium and aluminum. Also, insoluble inorganic metal hydroxides such as zinc, copper and cadmium hydroxides can be employed as ion conducting materials. In addition to zirconium phasphate, examples of other insoluble acid salts which can be employed as ion conducting materials to form ion exchange membranes are zirconium sulfate, titanium molybdate, titanium phosphate, and the like. The acids from which such insoluble acid salts are formed can include phosphoric acid, molybdic acid, and sulfuric acid, and the cation of such acid salts include metals such as zirconium, titanium, antimony, tungscten and vanadium. Ion exchange membranes formed from the insoluble acid salts and from the insoluble hydrous metal oxides are described in copending applications Ser. No. 326,985, now Patent 3,346,422, filed Nov. 29, 1963, of Carl Berger, and Ser. No. 326,709, filed Nov. 29, 1963, of Frank C. Arrance and Carl Berger now Patent No. 3,437,580. The description of such ion exchange membranes and the method of production thereof described in such applications are incorporated herein by reference.

Organic ion exchange membranes can also be employed such as, for example, an organic cation exchanger cross-linked polystyrene plastic in a polypropylene or polyethylene medium. However as previously noted, the organic ion conducting membranes are not preferred for use in conjunction with the water balancing agent principles of the invention.

The ion exchange membranes of the invention can be prepared by mixing the ion conducting material, e.g., zirconium phosphate, with the water balancing agent, e.g., silicic acid, in suitable proportions as described above. The mixture can then be granulated as desired and pressed into the form of discs which are then sintered.

Figure 2:
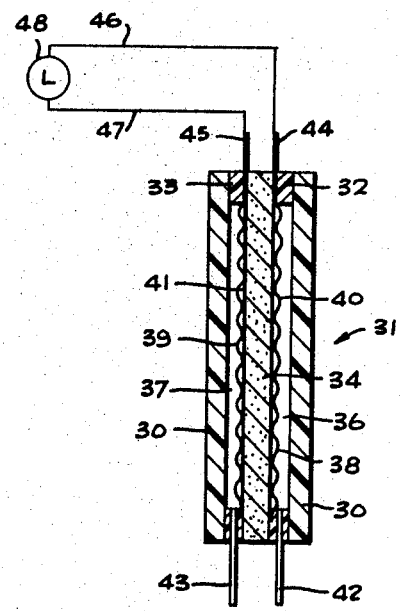

The use of the ion exchange membranes of the invention in a fuel cell will be more clearly understood by reference to the accompanying drawing wherein;

FIG. 1 illustrates schematically a fuel cell incorporating an ion exchange membrane according to the invention; and FIG. 2 shows a cross section of a typical fuel cell construction embodying a specific ion exchange membrane according to the invention.

Referring to FIG. 1 of the drawing, the fuel cell comprises essentially a case 10 containing therein an ion exchange membrane or ion conducting membrane 12 positioned centrally of the case and having a catalyst electrode 14 positioned in contact with one side of the membrane and a second catalyst electrode 16 positioned against the other side of the membrane. The membrane 12 accordingly divides the case 10 into two gas chambers 18 and 20 adjacent the respective catalyst electrodes 14 and 16. A conduit 22 is provided which communicates with the chamber 18 and a second conduit 24 is also provided which communicates with the chamber 20. Wires 26 and 28 are connected to the catalyst electrodes 14 and 16 respectively for connection in an external circuit.

Thus, for example, hydrogen can be introduced into chamber 18 via the conduit 22 and oxygen can be introduced into chamber 20 through conduit 24, where, for example, such fuel cell is a hydrogen-oxygen fuel cell. Thus, hydrogen in chamber 18 reacts at the catalyst electrode or anode 14 and is oxidized to form hydrogen ion which migrates through the ion conducting membrane 12 and reacts with hydroxyl ion adjacent the catalyst electrode or cathode 16, which hydroxyl ion is formed by reduction of the oxygen in chamber 20 at such catalyst electrode or cathode, forming water. As previously pointed out, the additives or water balancing agents of the invention contained in the ion exchange membrane provide a suitable water vapor pressure and retain water thus formed in the membrane particularly at temperatures above 100° C., to provide a membrane of low internal resistance and high conductivity.

Referring now to FIG. 2 of the drawing, there is shown a fuel cell 31 incorporating an ion exchange membrane according to the invention. The fuel cell 31 comprises a pair of back plates 30 which when assembled hold together a pair of adjacent neoprene gaskets 32 and 33 with the ion exchange membrane 34 sandwiched between the gaskets 32 and 33. In this embodiment the ion conducting membrane 34 is composed of zirconium phosphate containing silicic acid as a water balancing agent. The assembly of members 30, 32, 33 and 34 can be accomplished by use of any suitable adhesive or glue.

The central portion of the ion conducting membrane 34 is covered or coated with a platinum black catalyst on both sides of the membrane, indicated at 40 and 41. Prior to assembly of members 30, 32, 33 and 34, platinized screens 38 and 39 are placed in the center of gaskets 32 and 33 respectively, with the peripheral edges of the screens positioned between membrane 34 and the respective gaskets 32 and 33. Following assembly of the above-noted parts it will be seen that enclosed chambers 36 and 37 are formed on opposite sides of the ion conducting membrane 34, chamber 36 containing the screen 38 and the catalyst electrode 40, and chamber 37 containing screen 39 and the catalyst electrode 41. The screens 38 and 39 are of a corrugated or mesh material.

The fuel cell 31 is provided with a first conduit 42 which passes through gasket 32 and communicates with chamber 36, for passage of a gas, e.g., oxygen, into said chamber, and a second conduit 43 which passes through the gasket 33 and communicates with the opposite gas chamber 37, for passage of another gas, e.g., hydrogen, into such chamber. Terminals 44 and 45 are connected respectively to the platinized screens 38 and 39, such terminals extending exteriorly of the fuel cell. Terminals 44 and 45 are connected in an external circuit including the electrical wires 46 and 47 and a load indicated at 48.

The invention principles described above are also applicable to other fuel cells, such as ammonia and hydrocarbon fuel cells. In the former, ammonia can be introduced into chamber 37 and oxygen into chamber 36, and in the latter type fuel cell a hydrocarbon such as propane can be introduced into chamber 37 and oxygen into chamber 36. In each case water is produced in the electrochemical reaction, and is retained in the ion exchange membrane 34 by the above described water balancing agent, e.g., silicic acid, contained in such membrane, particularly at high operating temperatures above 100° C., and especially above 150° C. for the hydrocarbon fuel cell, resulting in the maintenance of high conductivity in the ion exchange membranes of these cells at such elevated temperatures.

Cell 31 of FIG. 2 operates in substantially the same manner as described above with relation to the cell shown schematically in FIG. 1.

The following are examples of practice of the invention:

Example 1

Ion exchange membranes according to the invention are prepared by first crushing a mixture of 1 part zirconium phosphate with 0.5 part silicic acid. The resulting granulated mixture is dried and then pressed into discs of 2 inches in diameter and about 0.30 inch thick, using pressures of the order of about 15 tons. The discs so formed are then sintered in an electric furnace at about 300° C. for about 24 hours.

A comparison of the conductivity of such ion exchange membranes with ion exchange membranes formed in the same manner as noted above but employing only zirconium phosphate is set forth in Table I below:

TABLE I

| Temperature, ° C. | Type of Membrane | Resistivity (ohm-cm.) |
|---|---|---|
| 115 | Zirconium phosphate | 3,000 |
| 110 | Zirconium phosphate and silicic acid | 30 |

The resistivity (as measure of conductivity) of the respective ion exchange membranes in Table I above is measured by means of an alternating current arrangement using platinized platinum electrodes and alternating current at 1,000 cycles per second, the apparatus being designed to provide for temperature and humidity control.

As seen from Table I, the resistivity of the ion exchange membrane of the invention employing a water balancing agent, e.g., silicic acid, is markedly less at elevated temperature above 100° C. as compared to the resistivity of the same ion exchange membrane but in the absence of the water balancing agent. The ion exchange membrane of the invention containing silicic acid as water balancing agent can be effectively employed in a fuel cell as described above and shown in FIG. 2 of the drawing, e.g., a hydrogen-oxygen fuel cell, the resulting fuel cell having good conductivity and operating efficiency at elevated temperatures of about 100° C., and above.

Example 2

Ion exchange membranes according to the invention are prepared in a manner similar to that set forth in Example 1, employing 1 part of hydrous zirconium oxide and 0.5 part phosphorus pentoxide.

Similar to the results shown in Table I above, the resulting ion exchange membrane containing phosphorus pentoxide as water balancing agent has substantially greater conductivity and correspondingly substantially lower resistivity of the order illustrated in Table I above, as compared to the same ion exchange membranes prepared from hydrous zirconium oxide alone.

Example 3

An ion exchange membrane according to the invention is prepared by mixing and granulating 1 part of zirconium oxide, 1 part of concentrated phosphoric acid (85% $H_3PO_4$), and 1 part Zeolon (an aluminosilicate). This mixture is dried for a period of hours at elevated temperature and then is pressed into discs 2 inches in diameter and 0.20 inch thick at 15 tons total load and sintered at 300° C. for about 24 hours. The electrical resistivity of this zirconium phosphate membrane containing aluminosilicate is 7 ohm-cm. at 90° C. and 95% RH (relative humidity). A membrane prepared in the same manner as described above employing 1 part of zirconium oxide and 1 part concentrated phosphoric acid and omitting the aluminosilicate water balancing agent, has a substantially higher resistivity (lower conductivity) under the same temperature and relative humidity as noted above, as compared to the low resistivity value of 7 ohm-cm. for the ion exchange membrane of the invention. The ion exchange membrane of the invention containing Zeolon as water balancing agent can be incorporated into a fuel cell as described above and illustrated in FIG. 2 of the drawing, e.g., a fuel cell operating on hydrocarbon fuels such as propane, providing a fuel cell having good conductivity and operating efficiency at the high operating temperatures of about 150° to about 200° C. for such cell.

Example 4

Ion exchange membranes are prepared as described in Example 3 above except that in place of the Zeolon, colloidal silica in one case and calcium chloride in another case, are employed. These two types of ion exchange membranes are tested for electrical conductivity (resistivity) and the results are noted in Table II below:

TABLE II

Zirconium phosphate
ion exchange membrane +: Resistivity (ohm-cm.)
   Colloidal silica _____ 80 at 65° C., 75% RH
   Calcium chloride _____ 100 at 65° C., 75% RH The same zirconium phosphate ion exchange membrane without the colloidal silica or calcium chloride has substantially higher resistivity than shown in Table II, under the same temperature and humidity conditions noted in Table II.

Example 5

An ion exchange membrane is prepared substantially according to the precedure of Example 3 above, employing as the ion exchange starting materials 1 part alumina, 1 part concentrated phosphoric acid, and 1 part of aluminum sulfate as water balancing agent. An ion exchange membrane is formed having a substantially lower resistivity as compared to the same ion exchange membrane prepared in the absence of the aluminum sulfate.

Example 6

Ion exchange membranes are prepared in a manner similar to that set forth in Example 1, employing 1 part cadmium hydroxide and 0.5 part activated alumina.

The resulting ion exchange membrane has substantially greater conductivity at temperature of the order of about 100° C. as compared to the same ion exchange membrane prepared from cadmium hydroxide alone.

Example 7

Additional examples of ion exchange membranes according to the invention are those prepared according to the procedure of Example 1 above from the following compositions:

TABLE III

| Components: | Percent by weight |
|---|---|
| (A) Zirconium phosphate | 85 |
|     Phosphorous pentoxide | 15 |
| (B) Hydrous zirconium oxide | 40 |
|     Aluminosilicate | 60 |
| (C) Hydrous titanium dioxide | 60 |
|     Copper sulfate | 40 |
| (D) Hydrous molybdenum oxide | 75 |
|     Aluminum sulfate | 25 |
| (E) Copper hydroxide | 35 |
|     Colloidal silica | 65 |
| (F) Hydrous zirconium oxide | 95 |
|     Copper chloride | 5 |
| (G) Zinc hydroxide | 60 |
|     Silica gel | 40 |

The ion exchange membranes prepared from the above compositions have a high conductivity which, in terms of resistivity as noted above, is generally below about 100 ohm-cm. at temperatures of the order of about 100° C.

From the foregoing it is seen that the invention provides improved ion exchange membranes particularly for use in fuel cells, said membranes incorporating means in the form of water retaining or water balancing agents which maintain high conductivity of the ion exchange membranes during operation of the fuel cell, particularly at elevated temperatures of the order of about 100° C. and above.

It will be understood that various modifications and adaptations of the invention can be made by those skilled in the art without departing from the spirit of the invention, and accordingly the invention is not to be taken as limited except by the scope of the appended claims.

We claim:

1. An ion exchange membrane which comprises an inorganic ion exchange material selected from the group consisting of insoluble hydrous metal oxides, insoluble metal hydroxides, and water insoluble acid salts, and about 1% to about 80% by weight of the composition of a substance selected from the group consisting of silicic acid, an aluminosilicate, phosphorus pentoxide, aluminum sulfate, copper sulfate, colloidal silica, silica gel, activated alumina, ammonium acid phosphate, and calcium chloride.

2. An ion exchange membrane as defined in claim 1, wherein said substance is employed in an amount of about 5% to about 50% by weight of the composition.

3. An ion exchange membrane which comprises an insoluble hydrous metal oxide, and about 1% to about 80% by weight of the composition of a substance selected from the group consisting of silicic acid, an aluminosilicate, phosphorus pentoxide, aluminum sulfate, copper sulfate, colloidal silica, silica gel, activated alumina, ammonium acid phosphate, and calcium chloride.

4. An ion exchange membrane which comprises an insoluble hydrous metal oxide and about 1% to about 80% of silicic acid by weight of the composition.

5. An ion exchange membrane which comprises hydrous zirconium oxide and about 1% to about 80% of silicic acid by weight of the composition.

6. An ion exchange membrane which comprises zirconium phosphate and about 1% to about 80% of silicic acid by weight of the composition.

7. An ion exchange membrane which comprises an insoluble hydrous metal oxide and about 1% to about 80% of an aluminosilicate by weight of the composition.

8. An ion exchange membrane which comprises hydrous zirconium oxide and about 1% to about 80% of an aluminosilicate by weight of the composition.

9. An ion exchange membrane which comprises zirconium phosphate and about 1% to about 80% of an aluminosilicate by weight of the composition.

10. A fuel cell ion exchange membrane in the form of a compressed sintered membrane comprising zirconium phosphate and about 1% to about 80% of silicic acid by weight of the composition.

11. A fuel cell comprising a pair of catalyst electrodes and an ion exchange membrane disposed between said electrodes, said ion exchange membrane comprising an inorganic ion exchange material selected from the group consisting of insoluble hydrous metal oxides, insoluble metal hydroxides, and water insoluble acid salts, and about 1% to about 80% by weight of the composition of a substance selected from the group consisting of silicic acid, an aluminosilicate, phosphorus pentoxide, aluminum sulfate, copper sulfate, colloidal silica, silica gel, activated alumina, ammonium acid phosphate, and calcium chloride.

12. A fuel cell comprising a pair of catalyst electrodes and an ion exchange membrane disposed between said electrodes, said ion exchange membrane being in the form of a compressed sintered membrane comprising zirconium phosphate and about 1% to about 80% of silicic acid by weight of the composition.

13. A fuel cell comprising a pair of catalyst electrodes and an ion exchange membrane disposed between said electrodes, said ion exchange membrane being in the form of a compressed sintered membrane comprising zirconium phosphate and about 1% to about 80% of an aluminosilicate by weight of the composition.

14. A fuel cell comprising a pair of catalyst electrodes and an ion exchange membrane disposed between said electrodes, said ion exchange membrane being in the form of a compressed sintered membrane comprising hydrous zirconium oxide and about 1% to about 80% of silicic acid by weight of the composition.

15. A fuel cell comprising a pair of catalyst electrodes and an ion exchange membrane disposed between said electrodes, said ion exchange membrane being in the form of a compressed sintered membrane comprising hydrous zirconium oxide and about 1% to about 80% of an aluminosilicate by weight of the composition.

References Cited

UNITED STATES PATENTS

| | | | |
|---|---|---|---|
| 3,265,536 | 8/1966 | Miller et al. | 136—86 |
| 3,266,940 | 8/1966 | Caesar | 136—86 |
| 3,276,910 | 10/1966 | Grasselli et al. | 136—86 |

WINSTON A. DOUGLAS, Primary Examiner

D. L. WALTON, Assistant Examiner

U.S. Cl. X.R.

136—153; 204—295; 210—510